United States Patent [19]

Takayanagi et al.

[11] Patent Number: 4,463,964
[45] Date of Patent: Aug. 7, 1984

[54] REAR SUSPENSION SYSTEM FOR MOTOR VEHICLES

[75] Inventors: Shinji Takayanagi; Yoshitaka Kato; Kunio Nanno; Osamu Yasunaga; Osamu Takeuchi; Ryozo Yamamoto; Kazuhiro Iwai; Hiroshi Kasai, all of Saitama, Japan

[73] Assignee: Honda Giken Kogyo Kabushiki Kaisha, Tokyo, Japan

[21] Appl. No.: 428,801

[22] Filed: Sep. 30, 1982

[30] Foreign Application Priority Data

Mar. 26, 1982 [JP] Japan .................................. 57-49860
May 21, 1982 [JP] Japan .................................. 57-86123

[51] Int. Cl.³ .............................................. B62K 25/02
[52] U.S. Cl. .................................. 280/284; 180/215; 180/227; 280/275
[58] Field of Search ............... 180/219, 227, 215; 280/275, 284, 283, 285, 286, 276

[56] References Cited

U.S. PATENT DOCUMENTS

| 3,907,332 | 9/1975 | Richardson | 280/285 |
| 4,058,181 | 11/1977 | Buell | 180/32 |
| 4,175,764 | 11/1979 | Johnson | 280/284 |
| 4,265,329 | 5/1981 | de Cortanze | 180/219 |
| 4,322,088 | 3/1982 | Miyakoshi et al. | 280/284 |
| 4,325,449 | 4/1982 | D'Addio et al. | 280/284 |
| 4,356,877 | 11/1982 | Kamiya | 280/284 |
| 4,363,375 | 12/1982 | Kamiya | 280/284 |

FOREIGN PATENT DOCUMENTS

| 56-60785 | 5/1981 | Japan . |
| 56-103679 | 8/1981 | Japan . |
| 1547827 | 6/1979 | United Kingdom . |

Primary Examiner—Richard A. Bertsch
Attorney, Agent, or Firm—Armstrong, Nikaido, Marmelstein & Kubovcik

[57] ABSTRACT

A rear suspension system for motor vehicles. Both leg ends of a gate-shaped swing arm which at its free end supports the central part of a rear axle are pivotably secured to a vehicle body frame, a tension rod is provided between the lower end of a downwardly extending swing link mounted near the free end of the swing arm and a portion of the vehicle body frame near and below the above pivoted point of the swing arm, and one end of a damper disposed between both legs of the swing arm in a position above the tension rod is mounted near and above the pivoted point of the swing arm, while the other end thereof is attached to the swing link. The rear suspension system can be mounted in a relatively narrow space, and even with devices of relatively large capacities mounted thereabout, it can exhibit its damping characteristics satisfactorily.

6 Claims, 8 Drawing Figures

REAR SUSPENSION SYSTEM FOR MOTOR VEHICLES

BACKGROUND OF THE INVENTION

1. Field of the Invention

This invention relates to a rear suspension system for motor vehicles and more particularly to a rear suspension system for off-road motorcycles, including three-wheeled motor vehicles having a single front wheel and two rear wheels and four-wheeled motor vehicles called buggies.

2. Description of Relevant Art

Off-road motorcycles there have used relatively large-sized and extremely low-pressure tires in consideration of comfort and stability. Road shocks are first cushioned by the tires and then further cushioned by suspension systems for wheels and particularly by a suspension system for rear wheels.

For such a rear suspension system to experience large bounces of the rear wheels and obtain good cushioning characteristics, it is preferable that the rear wheels be supported by a swing arm mechanism and that a progressive link mechanism be disposed between the swing arm mechanism and a damper. But in the case of the above-mentioned vehicles, it is necessary to relatively lower the vehicular height in order to lower the center of gravity of the vehicle body and to dispose an engine and its associated devices under the main frame and chassis. Therefore, if a conventional damper with a long stroke is to be mounted between a swing arm mechanism which supports rear wheels and an upper vehicular body frame, insufficient room may be available for its full stroke. It may be impossible to fully utilize this characteristic of the damper because of insufficient height and space even if its mounting can be done without any trouble. The above and like problems are encountered in the above-mentioned type of vehicles.

The present invention effectively overcomes such problems of a rear suspension system in vehicles having at least one rear wheel and improves its cushioning characteristic.

SUMMARY OF THE INVENTION

According to the present invention, there is provided a novel rear suspension sysem for a motor vehicle having at least one rear wheel, a swing member which supports the rear wheel at its rear end and a vehicular body frame to which is pivoted the front end of the swing member. The novel rear suspension system comprises a link member the upper end of which is pivoted to the rear end of the swing member, a rod member the rear end of which is pivoted to the lower end of the link member and the front end of which is pivoted to a lower mounting member positioned near and substantially under the pivoted portion of the vehicular body frame with the swing member, and a damper the rear end of which is pivoted to a vertically intermediate part of the link member and the front end of which is pivoted to an upper mounting member positioned near and substantially above the pivoted portion of the vehicular body frame.

It is an object of the present invention to provide a progressive link mechanism-type rear suspension system for motor vehicles which requires a relatively narrow mounting space and therefore can fully exhibit its cushioning characteristic even if devices of relatively large size are mounted in the vicinity thereof.

Preferred embodiments of the present invention will be described in detail hereinunder with reference to the drawings, from which further features, objects and advantages of the present invention will become apparent. CL BRIEF DESCRIPTION OF THE DRAWINGS FIG. 1 is a left side view of a three-wheeled motor vehicle having a rear suspension system according to a first embodiment of the present invention, with a left rear wheel being removed;

DETAILED DESCRIPTION OF PREFERRED EMBODIMENTS

Figure 1:
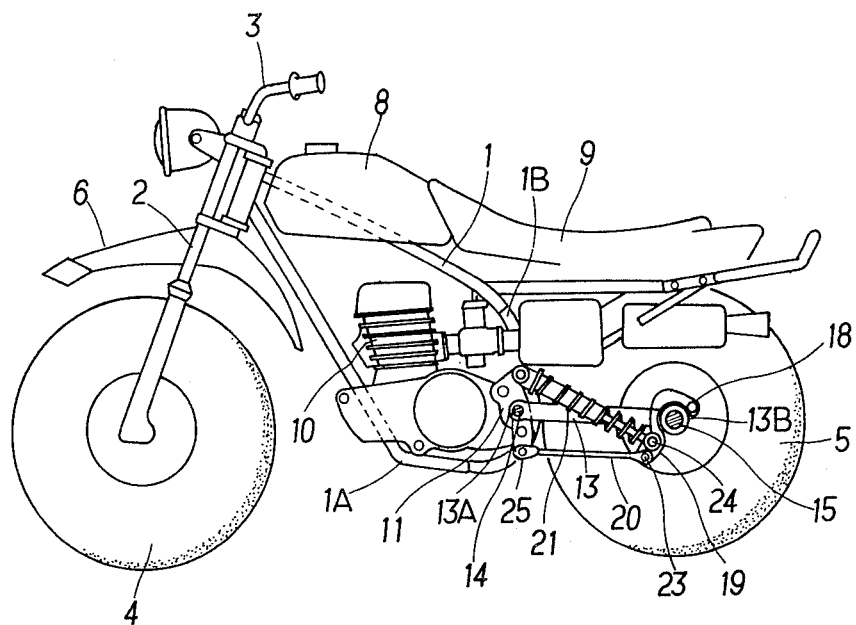
Figure 2:
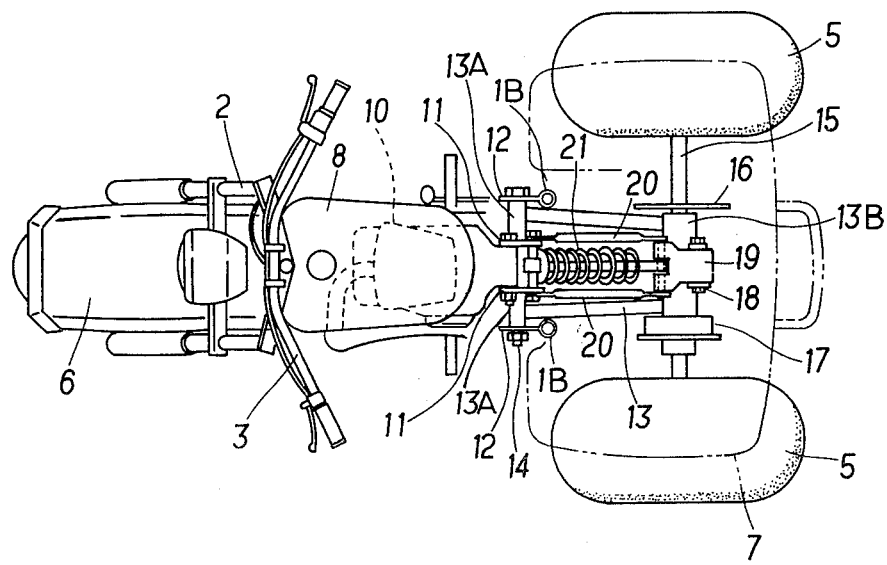
FIG. 2 is a plan view therefor of the embodiment shown in FIG. 1, with a driver's seat, a rear wheel fender and a rear-half portion of a vehicular body frame being omitted.

Referring first to FIGS. 1 through 4, the reference numeral 1 in FIGS. 1 and 2 designates a vehicular body frame, 2 a front fork, 3 a handle bar, 4 a front wheel, 5,5 a pair of right and left rear wheels, 6,7 front and rear fenders, respectively, 8 a fuel tank, and 9 a seat.

An internal combustion engine 10 is mounted on a lower frame 1A in a substantially intermediate position between the front wheel 4 and the rear wheel 5, and a pair of right and left vertical brackets 11, or mounting members, are fixed to the rear part of the engine 10, the brackets 11 being positioned between brackets 12 which are opposed to right and left longitudinal frame 1B.

Between the right and left brackets 11, 12 at the rear portion of the engine 10 are positioned front bearing tubes 13A formed at the front ends of both legs of a swing arm 13 which is generally U-shaped in plan view. A shaft 14 extends through the inner and outer brackets 11 and 12 and the front bearing tubes 13A. That is, the rear portion of the engine 10 is supported by the longitudinal frames 1B through the pivot shaft 14, and the swing arm 13 which is attached to the longitudinal frame 1B is vertically pivotable.

A rear axle 15 is inserted into a rear bearing tube 13B mounted at a free end or rear end of the swing arm 13 and thereby supported. Numeral 16 designates a driven sprocket mounted on the rear axle 15 and the numeral 17 designates a brake mechanism.

At the rear end of the swing arm 13 is disposed a swing link 19 whose upper end is pivotably attached to the upper surface of the rear bearing tube 13B by a transverse shaft 18 and whose intermediate and lower portions extend substantially downward. Between the lower end of the link 19 and the lower ends of the brackets 11 at the rear end of the engine 10 are disposed a pair of right and left tension rods 20 which are pivotable vertically. The tension rods 20 may be constructed in the form a turnbuckle.

Above the tension rods 20 and between both legs of the swing arm 13 is disposed in a damper 21, which slopes downwardly from front to rear and which becomes horizontal when the driver gets on the vehicle. The front end of the damper 21 is attached by a shaft 22 to the brackets 11 for mounting the engine 10 in a position above the swing arm pivot shaft 14, while the rear end thereof is attached by a shaft 24 to the swing link 19 in a position just above a connecting shaft 23 which pivots the rear ends of the tension rods 20 to the swing link 19. The front ends of the draw bars 20 are pivotably secured to the lower ends of the bracket 11 by a shaft 25.

When the swing arm 13 pivots about the pivot shaft 14 in accordance with the unevenness of the road surface on which the vehicle is travelling, the swing link 19 mounted at the rear end of the swing arm 13 also pivots up and down integrally. The upper end of the link 19 is pivoted to the swing arm 13 through the shaft 18, while the lower end thereof is connected to the brackets 11 of the vehicular body frame 1 through the tension rods 20, and the tension rods 20 are pivotable about the connecting shaft 25 with respect to the brackets 11. Consequently, the swing link 19 pivots about the pivot shaft 18 of the swing arm 13 while being restrained by the tension rods 20.

Figure 3:
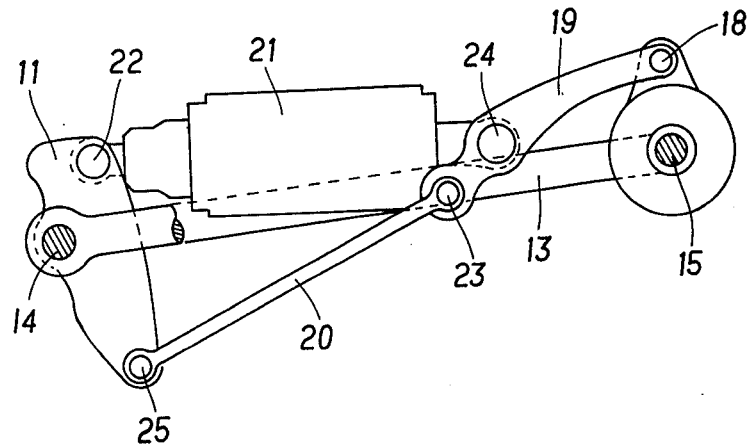
FIGS. 3 and 4 are each an enlarged left side view showing a state of operation of the rear suspension system shown in FIG. 1.
Figure 4:
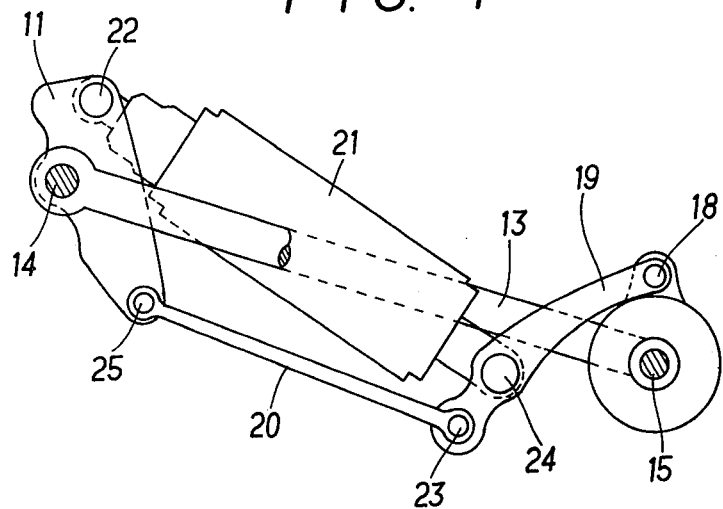

Therefore, when the swing arm 13 pivots upward as shown in FIG. 4 from its state as shown in FIG. 3, the swing link 19 pivots in a clockwise direction in the figure, so that a compression based on the pivotal movement of the swing arm 13 plus a compression based on the pivotal movement of the swing link 19 is exerted on the damper 21 whose rear end is pivoted to the lower end of the swing link 19. That is, as compared with the case where the damper 21 is compressed by only the pivotal movement of the swing arm 13, the rate of increase in its cushioning force becomes larger, and the damper 21 exhibits the so-called progressive characteristic.

Figure 5:
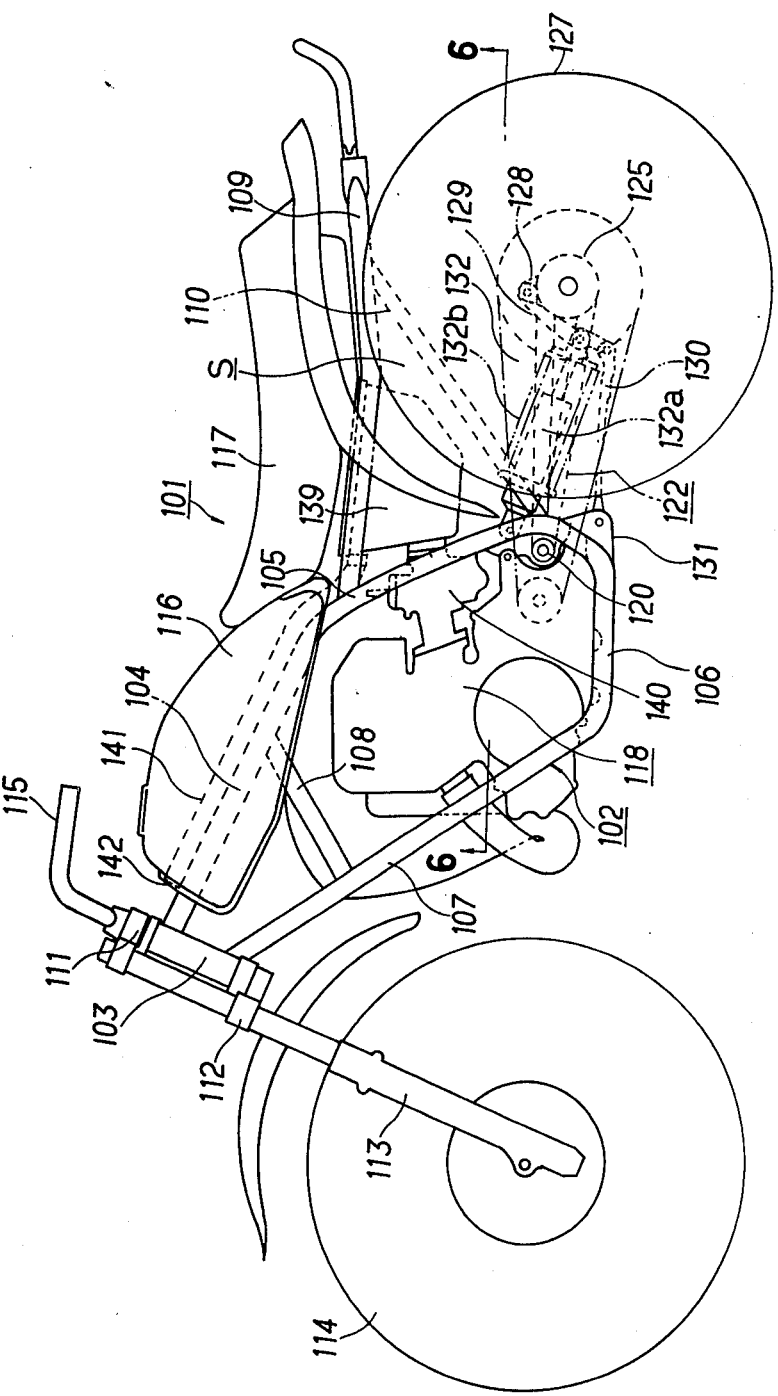
FIG. 5 is a left side view of a three-wheeled motor vehicle having a rear suspension system according to a second embodiment of the present invention.
Figure 6:
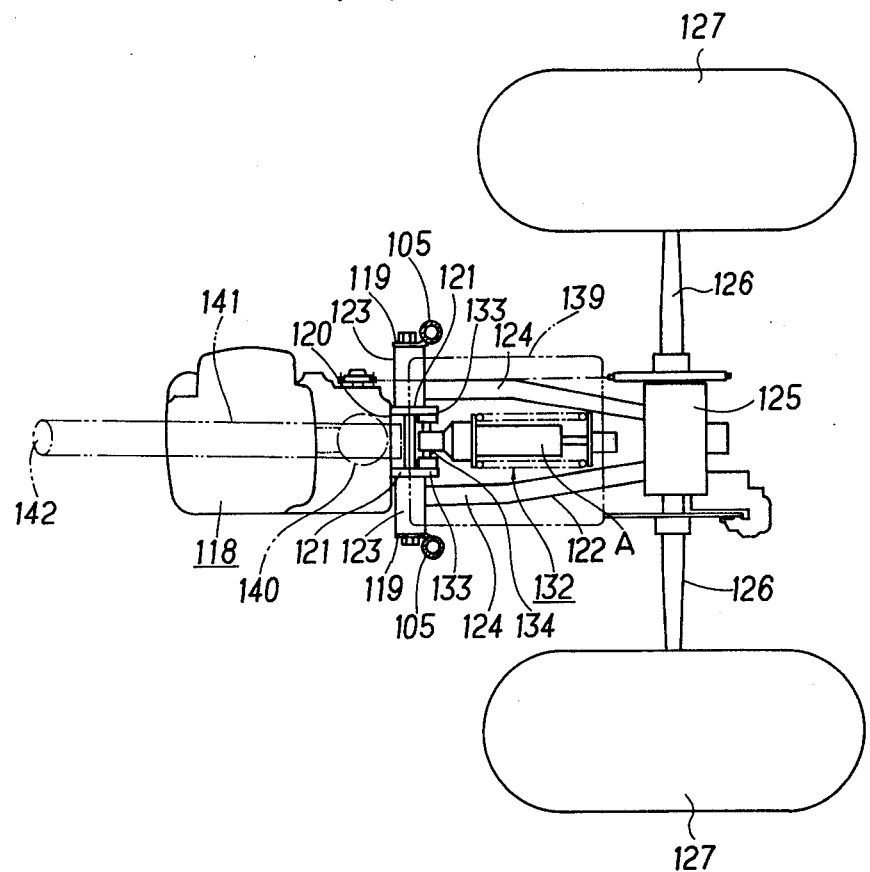
FIG. 6 is a view taken on line "6"—"6" of FIG. 5.

Referring now to FIGS. 5 and 6, there is schematically shown a construction of a three-wheeled motor vehicle to which the present invention was applied. The reference numeral 101 designates a three-wheeled motor vehicle for off roads such as waste lands and plains and numeral 102 designates a body frame of the three-wheeled vehicle 101. The front portion of the vehicular body frame 102 is constituted of a main frame 104 extending backward from an upper part of a head pipe 103, middle frames 105 extending downward from an intermediate point in a bifurcated manner to the right and left, substantially horizontal lower frames 106 turned up in the forward direction at the lower portions of the middle frames 105, down tubes 107 bent at the front portions of the lower frames 106 and extending obliquely upward with its front end being fixed to a lower part of the head pipe 103, and a reinforcing member 108 disposed between the main frame 104 and the down tube 107. The rear portion of the vehicular body frame 102 is constituted of a seat rail frame 109 extending backward from an upper part of the middle frame 105 and reinforcing members 110 disposed between the rear portion of the seat rail frame 109 and the lower portion of the middle frame 105. A front fork 113 is supported by the head pipe 103 through top and bottom bridge 111 and 112, and it supports a steering front wheel 114 at the lower portion thereof, with a handle 115 being mounted on the upper portion of the top bridge 111. On the other hand, on the main frame a fuel tank 116 is mounted, and on the seat rail frame behind the fuel tank 116 a seat 117 is mounted. Furthermore, an engine unit 118 is mounted on the lower frame 106.

The rear mounting structure of the engine unit 118 is as shown in FIG. 6. A pivot shaft 120 is attached transversely to brackets 119 mounted at the lower portion of the middle frames 105, and the lower portions of engine hangers 121 projecting backward from the rear portion of the engine unit are mounted thereon. Furthermore, front ends of bifurcated portions of a pair of right and left fork members 124 of a rear fork 122 are pivotally secured to the pivot shaft 120 in positions between the brackets 119 and the engine hangers 121. The rear fork 122 comprises a pair of right and left pivot pipes 123 pivoted to the pivot shaft 120, the backwardly extending fork members 124 being integral with the pivot pipes 123, and an axle bearing 125 being integral with the rear ends of the fork members 124. A rear axle 126 is supported by the axle bearings 125, and rear wheels 127 are attached to both right and left ends thereof.

On a substantially central upper side of the axle bearing 125 a bracket 128 is mounted upright as shown in FIG. 5, and an upper end or rear end of a link arm 129 is pivotably secured to the bracket 128 , while to the lower end or front end is pivotally connected the rear of the link arm 129 of a tension rod 130. The front end of the tension rod 130 is pivotably secured to a bracket 131 which is mounted upright by utilization of a support member (not shown) which is disposed transversely between the lower frames 106.

A damper 132 is pivoted at its rear end to the link arm 129 in a predetermined position near the front end of the arm 129, with the front end of the damper 132 being pivotably secured to a support shaft 134 which is mounted transversely between upper portions 133 (the paper surface side in FIG. 6) of the engine hangers 121, as shown in FIG. 6. In this case, unlike the prior art, the front end of the damper 132 is not attached to the seat rail frame 109 side, but is attached to the lower portion side of the vehicle body. Consequently, the inclination angle of the axis of the damper 132 relative to the horizontal direction becomes extremely small, and the damper position is substantially close to a horizontally mounted state.

The link damper 132 is of a relatively short tubular type provided internally with a damper 132a and externally with a cushion spring 132b.

The arm member 129 and the tension rod 130 constitute a progressive link mechanism.

Figure 7:
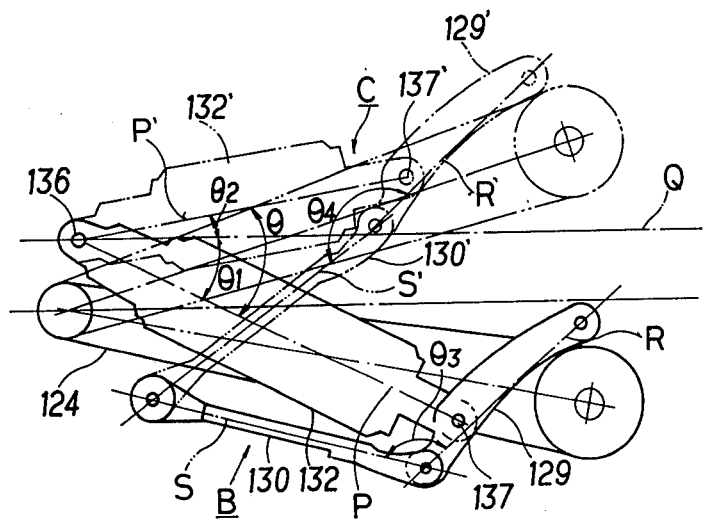
FIGS. 7 and 8 are schematic diagrams illustrating how the rear suspension system shown in FIG. 5 operates.

The following detailed description is now provided with reference to FIG. 7 about this damper unit provided with such a progressive link mechanism. In FIG. 7, a damper unit B shown in solid line is in a normal position, and a damper unit C shown in phantom is in a position under load of maximum shock.

In normal condition, the axis P of the damper 132 is inclined at an angle $\theta_1$ relative to a horizontal line Q which is substantially parallel to a line joining front axle (not shown) and rear axle 126, and a pivot point 137 of the damper 132 to the link arm 129 is positioned lower than an upper pivot point 136 thereof. The angle $\theta_3$ is the angle between line R joining both end pivot points of the link arm 129 and line S joining between both end pivot points of the tension rod 130.

On the other hand, with a shock load applied to the rear wheels, the rear fork 124 pivots upward up to the position shown in phantom. In this case, a pivot point 137′ of the damper 132′ is positioned above the front pivot point 136, the axis of the damper 132′ becomes P′ and its inclination angle $\theta_2$ relative to the horizontal line Q is shifted to the side opposite to the angle $\theta_1$ with respect to the horizontal line Q. The horizontal line Q passing through the pivot point 136 lies within in the range of maximum pivotal angle $\theta$ which is equal to ($\theta_1+\theta_2$).

The angle $\theta_4$ between line R' joining both end pivot points of a link arm 129' and line S' joining both and pivot points of a tension rod 130' becomes larger than the angle $\theta_3$ in normal condition, and an amount of compression of the damper 132 corresponding to this angular increase and the compression thereof based on the pivoting amount of the rear fork 124 are combined, whereby there is attained a progressive damping force characteristic which is enhanced curvilinearly relative to the upward pivoting amount of the rear fork 124.

Figure 8:
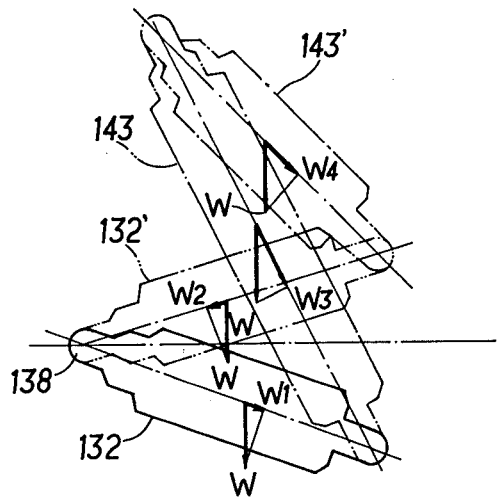

In this damper unit, as shown in FIG. 8, an axial component $W_1$ of the total weight W applied to the damper unit, particularly the damper 132, is small even in normal condition. Even under a shock load (indicated at 132' in the same figure), a component $W_2$ in the opposite direction is applied to a front portion 138 of the damper and the load is concentrated in the so-called springing direction, so the weight in the unspringing direction is reduced. At the same time, the position of the center of gravity can be lowered since the front portion 138 of the damper 132 is mounted on the lower portion side of the frame body 102. By way of comparison, phantom lines 143 and 143' represent dampers in the conventional damper mounting structure. In this case, it can be clearly seen that the center of gravity is high and damper axial loads $W_3$ and $W_4$ of the total weight W are concentrated on the lower side of the dampers 143 and 143', thus causing the weight in the upspringing direction to be heavier.

The reference numeral 139 shown in FIGS. 5 and 6 designates an air cleaner which is positioned above a relatively front part of the damper 132 and disposed in space S surrounded by the middle frame 105, seat rail frame 109 and reinforcing member 110. Thus, in the conventional damper arrangement, the damper exists substantially in the space S, and therefore, the utilizable space is quite restricted. On the other hand, in the present embodiment, the damper 132 is positioned substantially below the space S, and this arrangement permits not only an effective utilization of the space S but also the placement therein of a relatively large-sized air cleaner. In the illustrated embodiment, the upper portion of the air cleaner 139 is secured by means of the seat rail frames 109, and the lower front portion of the cleaner 139 is connected to the upper rear portion of the engine unit 118 through a carburetor 140. In this case, since the air cleaner 139 can be positioned effectively, it becomes possible to connect it with the engine unit 118 at a relatively short distance. To the upper front portion of the air cleaner 139 is connected the rear end of an air intake pipe 141. The air intake pipe 141 extends forward along the upper outer surface of the main frame 104 and an intake port 142 formed at its front end is extended in front of the fuel tank 116, that is, near the head pipe 103, which position is less affected by sand, dust, or the like.

Thus, since the air cleaner 139 is disposed above the damper 132, the space formed above the damper 132 can be utilized effectively. For example, it becomes possible for a three-wheeled motor vehicles for off-road travel to be equipped with a relatively large-sized desirable air cleaner, and such air cleaner can be positioned just after the engine unit and connected to the engine effectively at the shortest distance. Thus, the rear suspension system of the present invention has great utility.

Although in the above description the rear suspension system of the present invention was applied to a three-wheeled motor vehicle, it is applicable also to other motorcycles and the like.

What is claimed is:

1. In a motor vehicle having at least one rear wheel, a swing member which at the rear end thereof supports said rear wheel, and a vehicle body frame to which is pivoted through a mounting member the front end of said swing member, a rear suspension system comprising:
   a link member, the upper end of said link member being pivoted to the rear end of said swing member;
   a rod member, the rear end of said rod member being pivoted to the lower end of said link member and the front end of which is pivoted to a lower end of said mounting member positioned near and substantially under the pivoted portion of said vehicle body frame; and
   a damper, the rear end of said damper being pivoted in an intermediate part in the vertical direction of said link member and the front end of said damper being pivoted to an upper end of said mounting member positioned near and substantially above said pivoted portion of said vehicle body frame.

2. A rear suspension system according to claim 1, wherein said pivoted portion of said vehicle body frame is positioned on a lower rear side of said vehicle body frame.

3. A rear suspension system according to claim 2, wherein said damper normally assumes a substantially horizontal posture.

4. A rear suspension system according to claim 2, wherein said damper is pivotable about said pivoted portion in a predetermined angular range, with a horizontal line extending backward from said pivoted portion being included in said angular range.

5. A rear suspension system according to claims 2, 3 or 4, wherein said motorcycle is further provided with an air cleaner, and said damper is disposed substantially under said air cleaner.

6. A rear suspension system according to claim 1, wherein said motorcycle is a three-wheeled motor vehicle for off-road driving.

* * * * *